(No Model.)

W. B. TEALE.
DRIVING CHAIN.

No. 528,622. Patented Nov. 6, 1894.

WITNESSES
Charles Bosworth Kelley
Herbert Whitehouse.

INVENTOR
William Benjamin Teale

THE NORRIS PETERS CO., PHOTO-LITHO., WASHINGTON, D. C.

UNITED STATES PATENT OFFICE.

WILLIAM BENJAMIN TEALE, OF BIRMINGHAM, ENGLAND.

DRIVING-CHAIN.

SPECIFICATION forming part of Letters Patent No. 528,622, dated November 6, 1894.

Application filed March 13, 1894. Serial No. 503,488. (No model.) Patented in England November 3, 1893, No. 20,485.

*To all whom it may concern:*

Be it known that I, WILLIAM BENJAMIN TEALE, a subject of Her Majesty the Queen of Great Britain and Ireland, residing at Birmingham, in the county of Warwick, England, have invented certain new and useful Improvements in Driving-Chains, (for which I have jointly with James Ward Milligan obtained a patent in Great Britain, No. 20,845, bearing date November 3, 1893,) of which the following is a specification.

This invention has reference to driving chains of the kind which consists of alternate connecting blocks and side links jointed together by cross pins and used for bicycles and other velocipedes and in other machines and apparatus for transmitting power and rotary motion. Prior to this invention driving chains of this kind have been made with hardened sheet steel bushes fixed on the joint pins to prevent wear various means having been adopted for preventing the said bushes turning on the joint pins and for preventing the joint pins turning in the side links to which they are fixed.

My invention consists of the herein described improved method of connecting the hardened steel bushes and joint pins to the side links so as to effectually prevent the bushes turning on the joint pins and prevent the joint pins turning in the side links.

Figure 1:
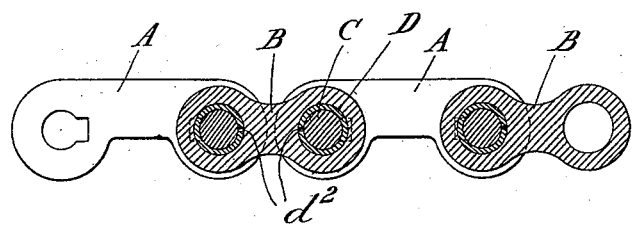
Figure 2:
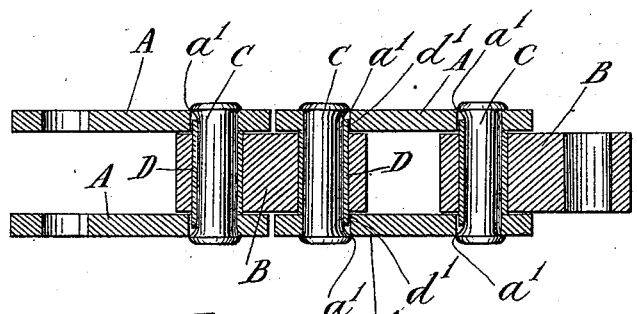
Figure 3:
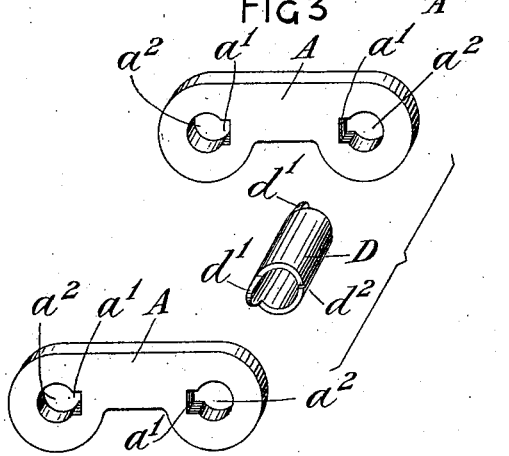
Figure 4:
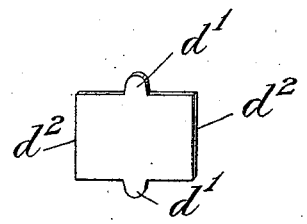

Referring to the drawings which form a part of this specification Figure 1 is a sectional elevation of a piece of driving chain constructed according to this invention and Fig. 2 is a sectional plan of the same. Fig. 3 shows two of the side links and one of the hardened sheet steel bushes separately and Fig. 4 shows a thin sheet steel blank for forming one of the said bushes.

The same letters of reference indicate the same parts in all the figures of the drawings.

The side links are marked A, the connecting blocks B, the joint pins C, and the hardened steel bushes D.

In carrying out this invention I fix the hardened sheet steel bushes D to the side links A by making each of the bushes D with a small projection $d'$ at each end as shown which projections fit into corresponding lateral notches $a'$ made in the joint pin holes $a^2$ in the side plates A. Each of these notches $a'$ is made in that side of the joint pin hole $a^2$ which is nearest to the main portion of the link, as shown in Fig. 3, so as not to diminish the strength of the eye, and the end projections $d'$ on the bush are as shown made at about midway between the meeting sides $d^2$ of the sheet steel blank as shown in Fig. 4 so that when this blank is formed into the bush D the sides $d^2$ will meet at that part of the joint pin C where there is the least wear. The length of each of the end projections $d'$ is rather less than the thickness of the side link A so that when the parts of the chain are fitted together and the soft round steel wire joint pins C are inserted in the holes $a^2$ and bushes D the act of riveting the ends of the joint pins will cause them to spread slightly into the recesses $a'$ in the side links and effectually prevent any possibility of the joint pin C turning round.

Having now described my invention, what I claim as new, and desire to secure by Letters Patent, is—

1. In combination in a drive chain, the links A having eyes with notches $a'$, the bushing $d^2$ having projections $d'$ extending into the said notches and the joint pin C extending through the bushing and the eye of the link and headed over and within said eye to bear on the projection $d'$ to hold the same in place, substantially as described.

2. In combination in a drive chain, the links having the notches $a'$ extending toward each other in the main body of the link, the bushings consisting of a sheet metal piece having its edges abutting and having also the projections $d'$, said projections extending into the notches and the joint pin extending through the bushing and engaging the links the said notches and projections serving to determine the position of the bushings and abutting edges thereof where the least wear will occur, substantially as described.

In witness whereof I have hereunto set my hand in presence of two witnesses.

WILLIAM BENJAMIN TEALE.

Witnesses:
CHARLES BOSWORTH KETLEY,
HERBERT WHITEHOUSE.